United States Patent [19]

Kleiner et al.

[11] 4,158,538

[45] Jun. 19, 1979

[54] APPARATUS FOR THE CONTINUOUS PRODUCTION OF CONTINUOUS PLASTICS FOAM WEBS

[75] Inventors: Frank Kleiner, Cologne; Karl H. Müller, Quadrath-Ichendorf, both of Fed. Rep. of Germany

[73] Assignee: Bayer Aktiengesellschaft, Leverkusen, Fed. Rep. of Germany

[21] Appl. No.: 715,078

[22] Filed: Aug. 17, 1976

[30] Foreign Application Priority Data

Sep. 6, 1975 [DE] Fed. Rep. of Germany ........ 2539701

[51] Int. Cl.² .............................................. B29D 27/00
[52] U.S. Cl. .................... 425/445; 34/57 D; 34/156; 264/DIG. 18; 425/817 C
[58] Field of Search ............... 425/4 C, 817 C, 445, 425/404, 377, 71, 73, 75, DIG. 19, DIG. 2, DIG. 39; 34/10, 57 C, 570, 57 E, 156; 264/88, 93, DIG. 18, 45.5, 45.9, 46.1, 26; 432/8; 219/10.81

[56] References Cited

U.S. PATENT DOCUMENTS

| 2,317,409 | 4/1943 | Seaton ..................................... 264/26 |
| 3,711,584 | 1/1973 | Sagane et al. ................... 425/4 C X |
| 3,722,105 | 5/1973 | Marteny ............................. 34/156 X |
| 3,767,744 | 10/1973 | Holl .............................. 425/817 C X |
| 3,832,106 | 8/1974 | Rivat-Lahousse ................... 425/4 C |

FOREIGN PATENT DOCUMENTS 47-24269  5/1972  Japan ................................... 425/817 C Primary Examiner—Roy Lake
Assistant Examiner—Mark Rosenbaum
Attorney, Agent, or Firm—Sprung, Felfe, Horn, Lynch & Kramer

[57] ABSTRACT

The invention relates to an apparatus for the continuous production of continuous plastics foam webs from extruded polyolefin webs containing peroxide and blowing agent by cross-linking on a perforated conveyor belt with subsequent foaming, suspended freely in space into a continuous heating furnace.

8 Claims, 3 Drawing Figures

APPARATUS FOR THE CONTINUOUS PRODUCTION OF CONTINUOUS PLASTICS FOAM WEBS

The invention relates to an apparatus for the continuous production of continuous plastics foam webs by the cross-linking and expansion of extruded polyolefin webs containing peroxide and blowing agents.

Plastics foams of low density of cross-linked polyolefins, in particular high pressure polyethylene, possess a series of properties which permits their use in greatly varying applications. Economic production is the requirement which must be met to exploit these advantages.

Several processes for the production of these plastics foam webs are already known.

In a discontinuous process for example a mixture of a high pressure polyethylene is homogenised with a blowing agent and a cross-linking agent on a mixer. The non-cross-linked and unexpanded rolling sheet is laid in a gas-tight, fitting mould. Heating to above the separation temperature of the blowing agent and cooling to below the point of solidification takes place under high pressure. The actual expansion then takes place in a heating chamber at temperatures of from 85 to 110° C. This process produces a plastics foam of high quality which is however limited in its dimensions by the size of the press available and which, because of the technical complexity, is very expensive.

A continuous web is produced from polyethylene containing blowing agents, in a continuous process, using an extruder, which is partially cross-linked by heat radiators with suitable intensity and wavelengths at a temperature just above the crystallite melting point. The web thus pre-treated is expanded at a temperature above the decomposition temperature of the blowing agent, either on one side running over heated rollers, or on both sides with simultaneous downwards movement and lateral guiding by revolving induced draught belts by means of heat radiators to form a plastics foam web.

In addition to high capital investment required, the low thickness of the plastics foam webs which can be achieved of 5 to 6 mm is disadvantageous. Moreover the formation of folds in the plastics foam web cannot always be avoided in the case of lateral guiding.

In a further continuous process, in addition to the blowing agent, a cross-linking agent, e.g. peroxide, is added to the polyethylene and this mixture is also extruded without reaction of the additive to form a continuous web which is then preheated in a continuous furnace on a conveyor belt of wire material from both sides by a hot air flow increasing in three heating stages, then cross-linked and expanded to form plastics foam webs.

This process requires a long broad furnace since the process stages are juxtaposed and the conveyor belt running through the furnace must be designed over the whole length for the greatest width, namely the width of the finished plastics foam web. The unintentional adhesion of the surface layer of the web melted for cross-linking purposes to the wire material and the friction on the belt during foaming increases the danger of fold formation.

The object of the invention is to provide an apparatus which facilitates the continuous production of continuous plastics foam webs from polyolefin using cross-linking and blowing agents with low energy consumption and compact construction and providing expansion unhindered on all sides without fold formation.

According to the invention there is provided an apparatus for the continuous production of continuous plastics foam webs by the cross-linking and expansion of extruded polyolefin webs containing peroxide and blowing agents in a continuous heating furnace, characterised in that a polyolefin web carried on a perforated conveyor belt, after preheating at a temperature just below the crystallite melting point is cross-linked by a heat surge higher than preheating temperature by 50° to 100° C. under exothermic heat development, and then after careful release from the conveyor belt by gravity, free in space and stabilised in a curve by aerodynamic air guiding, is completely foamed under renewed heat application to separate the blowing agent.

The advantages achieved with the method according to the invention are that quite unexpectedly and surprisingly in relation to the previous teaching, after a short temperature surge of 50° to 100° C. above the crystallite melting point of the polyethylene, the cross-linking process continues by exothermic heat development, while the blowing agent separation insofar as it has in fact begun, is terminated optionally by blowing with cooler air.

By separating the cross-linking and foaming process, it is possible to substantially shorten the conveyor belt which here is only required during cross-linking and to limit it to the smaller width of the extruded web. At the same time the hot air circulation is more favourable because of the smaller space.

The quantity of heat required for cross-linking is lower since after the short heat surge, the further cross-linking process takes place automatically by exothermic heat development. The structure of the plastics foam web is more uniform as a result of the possibility of free expansion on all sides. The surface is also favourably influenced by the gentle release of the polyolefin web from the belt by means of gravity. The formation of folds no longer occurs because of the stabilisation of the polyolefin web by the hot air flow.

According to the invention, the apparatus for carrying out the invention comprises a perforated conveyor belt with heating devices arranged at a distance above and below the load strip in a plurality of consecutive heating zones and with a winding device, characterised in that below the release point 11 of the cross-linked polyolefin web from the conveyor belt 1 there is arranged a revolving wheel 12 subdivided into cells having an aerodynamically formed periphery 18, which is provided for hot air with an axial inflow pipe 13 and at the periphery with a non-revolving exhaust zone adjustable by means of flaps 14, which is surrounded at a specific distance by a chamber 17 with inwards directed hot air outlets.

As a result of the adjustability of the air quantity flaps, the form of the cellular wheel periphery and the arrangement of the hot air openings, the light polyolefin foam web is conveyed near the necessary heat application in a stabilised curve suspended freely in space, so that optimum conditions are present for foaming.

In one embodiment of the apparatus according to the invention, the means for directing hot air is a perforated conveyor belt with heating devices arranged at a distance above and below the load strip in three consecutive heating zones and with a winding device, characterised in that on either side of a polyolefin web guided freely in an arc, between the release point 22 of the cross-linked polyolefin web from the conveyor belt and the water cooled discharge rollers 27, there are arranged two or more mutually opposed blowers 23, 24 with feed pipes 25, 26 for hot air.

By virtue of this embodiment the web can also be substantially stabilised in order to avoid fold formation and at the same time be subjected on all sides to hot air for total expansion.

In a particular embodiment of the apparatus according to the invention, in order to adjust the pre-stressing and gripping power of the polyolefin web, the conveyor belt is adjustable at an angle between 0° and 50° to the horizontal.

By a corresponding adjustment of the angle of the conveyor belt, the longitudinal pre-stressing for influencing the transverse contraction during the cross-linking of the polyolefin strip and the cohesion of a free-hanging loop can be favourably influenced. At the same time the raising of the extruder necessary to accommodate the foaming web is avoided.

Embodiments of the invention are illustrated in the drawings and described in more detail in the following.

Figure 1:
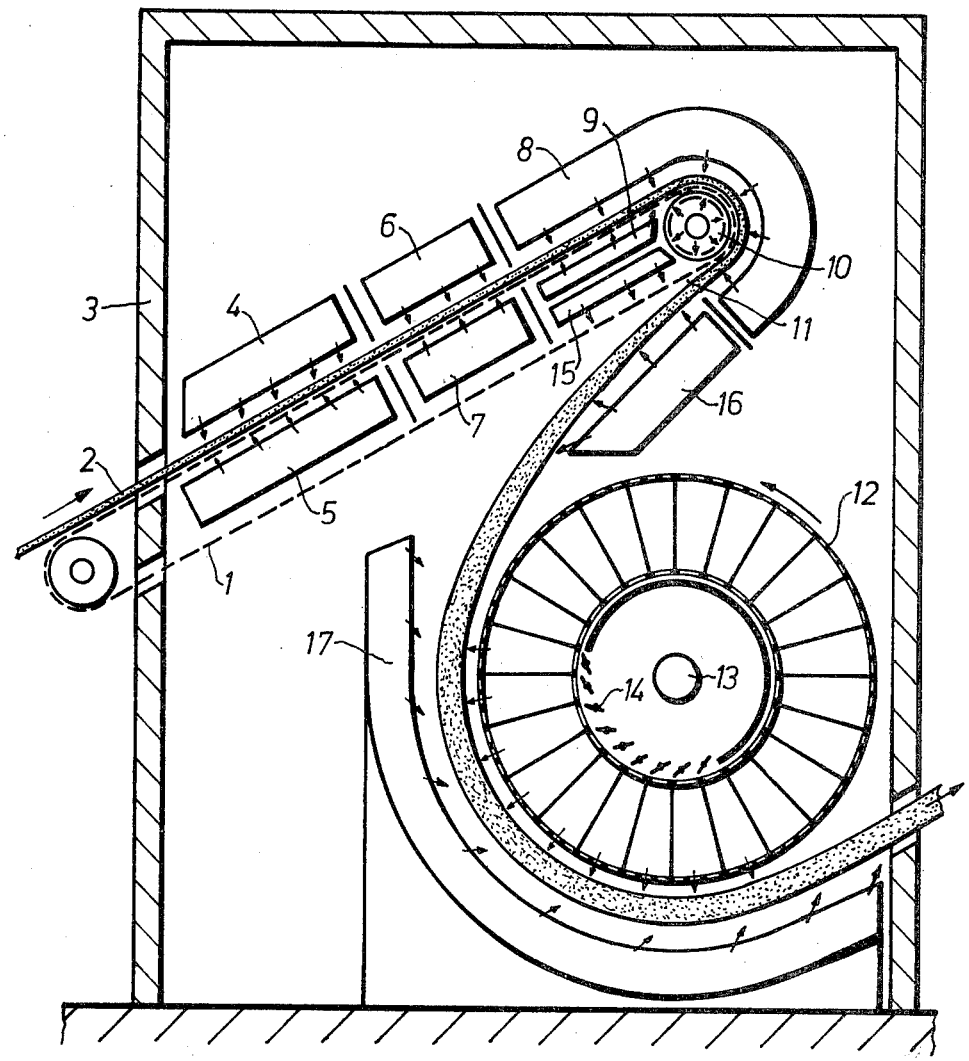
FIG. 1 shows a first embodiment of an apparatus according to the invention comprising a cellular wheel shown in section.

As shown in FIG. 1, a perforated conveyor belt rising at an angle in the range of from 0° to 50° which is loaded with an extruded polyolefin web 2 containing wetting and blowing agents, after passing an insulated housing outer wall 3 runs between the heaters 4 to 10 arranged in each case on either side of the load strip, for tempering 4,5 at a temperature just below the crystallite melting point, to trigger off the cross-linking 6,7 at a temperature higher by from 50° to 100° C. and for maintaining 8,9 and 10 at the cross-linking temperature. Infrared radiators, electrical resistance elements or hot air heaters can be used as the heaters. Below the release point 11 of the polyolefin web from the conveyor belt 1 there is arranged a cellular wheel 12, which by means of hot air fed in through an axial inflow pipe 13, adjustable flaps 14 and radial outlet openings 19 guides the freely hanging polyolefin web with simultaneous foaming, wherein additional hot air from chambers 15, 16, 17 supports the process.

Figure 2:
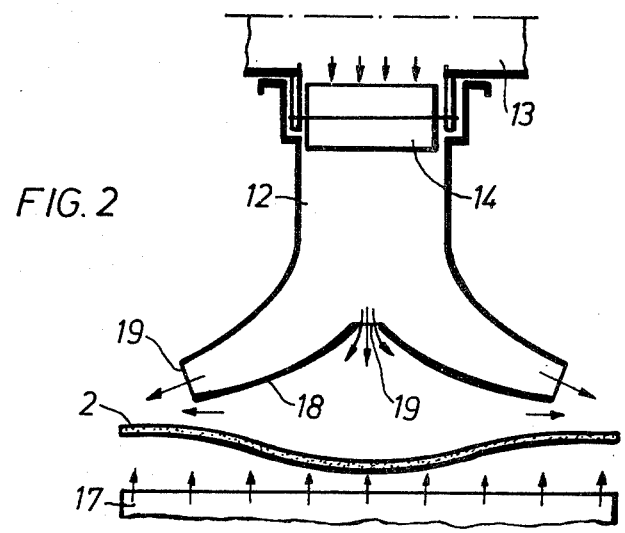
FIG. 2 shows a cellular wheel in section.

FIG. 2 shows in detail the cross-section of the cellular wheel 12. Hot air issues from the nozzles 19 which both guide the polyolefin strip as a result of aerodynamic forming without creases and freely suspended in space, and supplies the necessary heat for the complete foaming of the web, with further hot air being supplied through openings in the chamber 17 to assist the process.

Figure 3:
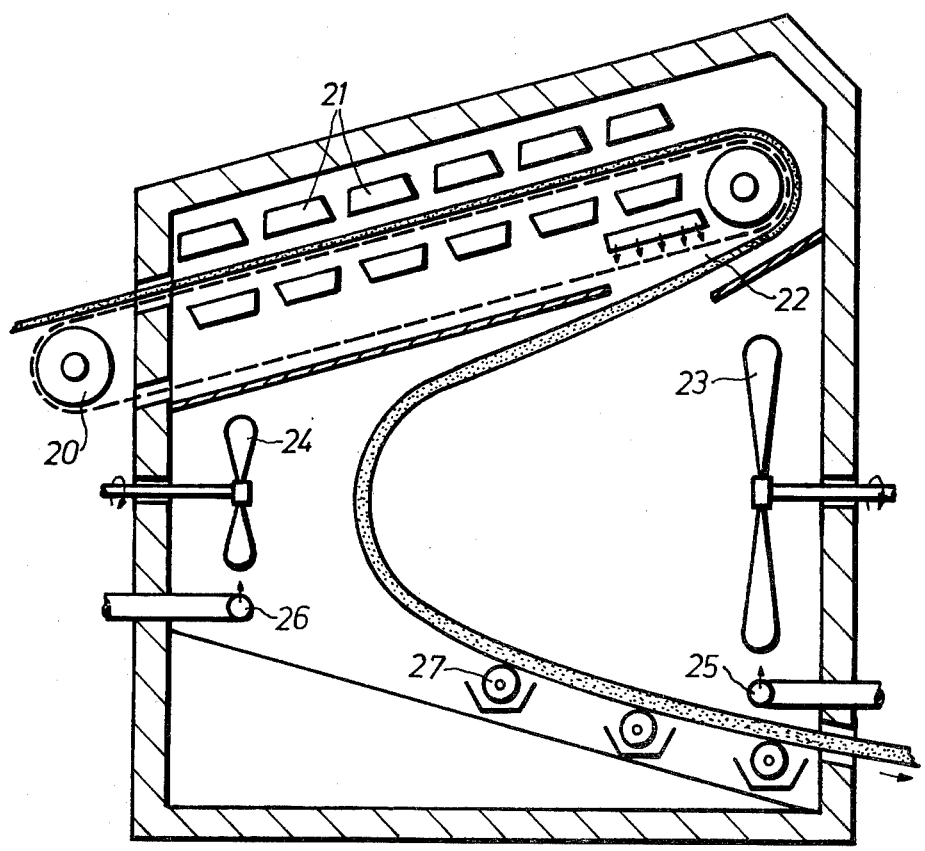
FIG. 3 shows a second embodiment of an apparatus according to the invention comprising a blower shown in section.

In FIG. 3, the conveyor belt is equipped with individually adjustable infrared radiators 21. Below the release point 11 there are arranged two mutually opposed blowers 23, 24, which are fed with hot air from the connections 25, 26, to supply heat for the purpose of foaming and stabilising the loop. Water cooled discharge rollers 27 are provided at the furnace floor to support the finished plastics foam web.

EXAMPLE

Using the apparatus of FIGS. 1 and 2, an extruded, continuous strip of high pressure polyethylene provided with peroxide and blowing agent having a thickness of 3.2 mm and a width of 400 mm is conveyed on a conveyor belt rising at 45° consisting of wire fabric at a speed of 2.3 m/min. into a furnace and subjected on both sides to hot air from chambers.

Hot air at 140° C. is used for pre-heating. The subsequent cross-linking is triggered off by a hot air surge at 238° C. and then takes place spontaneously at a hot air temperature of 160° C.

After release from the conveyor belt, the web, stabilised by the hot air flow from the cellular wheel and chambers connected thereto, is foamed by the separation of the blowing agent at a hot air temperature of 222° C. to form a finished plastics foam web having a thickness of 11 mm and a width of 1.1 m, and after leaving the furnace is wound.

What we claim is:

1. An apparatus for the continuous production of continuous plastic foam webs comprising: a conveyor belt inclined at an angle from 0° to 50° to the horizontal for conveying a polyolefin web preheated to below the crystallite melting point; heating means disposed above and below the surface of the belt in a plurality of zones for heating the web to cross-link same; and means downstream of the conveyor belt for blowing hot air towards the web after it is released from the conveyor belt to both guide the web in a freely suspended state in space in an arcuate path and apply heat to the web to induce foaming.

2. An apparatus as claimed in claim 1, wherein the means for blowing hot air towards the web comprises at least two inlet pipes for hot air and at least two blowers for directing the hot air towards the web.

3. An apparatus as claimed in claim 2, further comprising water cooled rollers for removing the web from the zone in which it is suspended freely in space.

4. An apparatus as claimed in claim 1, wherein the heating devices are hot air heaters.

5. An apparatus as claimed in claim 1 wherein the heating devices are infrared radiators.

6. An apparatus as claimed in claim 1 wherein the heating devices are electrical resistance heaters.

7. An apparatus for the continuous production of continuous plastics foam webs comprising a perforated conveyor belt for conveying a polyolefin web, heating devices arranged above and below the surface of the conveyor belt on which the web is conveyed in a plurality of consecutive heating zones and means, downstream of the conveyor belt for blowing hot air towards the web after it is released from the conveyor belt, so as to guide the web while it is suspended freely in space and so as to apply heat to the web to induce foaming, wherein the means for blowing hot air towards the web comprises a revolving wheel subdivided into cells from which the air is directed outwardly towards the web, the hot air being supplied to the cells from a zone at least partially surrounded by flaps which do not revolve about the axis of the wheel which, when open, allow hot air to enter the cells.

8. An apparatus as claimed in claim 7, further comprising a chamber radially spaced from the wheel and extending around a portion of the periphery thereof from which hot air may be directed inwardly towards the web.

* * * * *